United States Patent
Zantz et al.

(10) Patent No.: US 9,434,469 B2
(45) Date of Patent: Sep. 6, 2016

(54) DRIVE SYSTEM FOR CONTROL SURFACES OF AN AIRCRAFT

(71) Applicants: Airbus Operations GmbH, Hamburg (DE); Technische Universitaet Hamburg-Harburg, Hamburg (DE)

(72) Inventors: Tanno Zantz, Achim (DE); David Arriola, Buxtehude (DE); Stefan Benischke, Hamburg (DE); Frank Thielecke, Buxtehude (DE)

(73) Assignees: Airbus Operations GmbH (DE); Technische Universitaet Hamburg-Harburg (DE)

( * ) Notice: Subject to any disclaimer, the term of this patent is extended or adjusted under 35 U.S.C. 154(b) by 617 days.

(21) Appl. No.: 13/962,011

(22) Filed: Aug. 8, 2013

(65) Prior Publication Data

US 2014/0042269 A1 Feb. 13, 2014

Related U.S. Application Data

(60) Provisional application No. 61/681,169, filed on Aug. 9, 2012.

(30) Foreign Application Priority Data

Aug. 9, 2012 (EP) .................................... 12179891

(51) Int. Cl.
*B64C 13/28* (2006.01)
*B64C 13/34* (2006.01)
*B64C 13/42* (2006.01)

(52) U.S. Cl.
CPC ............... *B64C 13/34* (2013.01); *B64C 13/28* (2013.01); *B64C 13/42* (2013.01); *Y02T 50/44* (2013.01)

(58) Field of Classification Search
CPC ....... B64C 13/28; B64C 13/24; B64C 13/34; B64C 9/16; B64C 9/02; B64C 9/22; B64C 9/20; B64C 3/50; B64D 2025/011
USPC ........... 244/211–217, 76 A, 89, 90 R, 99.14, 244/99.2, 99.3, 99.4
See application file for complete search history.

(56) References Cited

U.S. PATENT DOCUMENTS 4,405,105 A   9/1983   Dilmaghani et al.
4,721,016 A   1/1988   Burandt
(Continued)

FOREIGN PATENT DOCUMENTS

CN    102458983 A    5/2012
DE    103 13 728 A1  10/2004
(Continued)

OTHER PUBLICATIONS

Chinese Office Action dated Oct. 29, 2015.

*Primary Examiner* — Benjamin P Lee
(74) *Attorney, Agent, or Firm* — Lerner, David, Littenberg, Krumholz & Mentlik, LLP

(57) ABSTRACT

A drive system for driving control surfaces of an aircraft includes at least one drive unit, at least one main shaft connectable to the at least one drive unit and at least two adjusting units for each control surface to be driven. Each adjusting unit includes a differential, two rotary actuators and an adjustment lever. The differential has at least one input means and two output means and is adapted to transfer torque from the at least one input means to the two output means. The input means is connectable to the main shaft, the two rotary actuators each have a rotation input means and a motion output means. The rotation input means is connectable to one of the output means of the differential each and the adjustment lever is connected to the motion output means of both rotary actuators.

15 Claims, 11 Drawing Sheets

(56) References Cited

U.S. PATENT DOCUMENTS

| | | | |
|---|---|---|---|
| 4,742,730 A | 5/1988 | Dorn et al. | |
| 4,779,822 A * | 10/1988 | Burandt | B64C 13/34 244/213 |
| 4,892,274 A | 1/1990 | Pohl et al. | |
| 4,932,613 A | 6/1990 | Tiedeman et al. | |
| 4,932,929 A * | 6/1990 | Capewell | B64C 13/34 244/99.2 |
| 4,979,700 A | 12/1990 | Tiedeman et al. | |
| 5,071,397 A | 12/1991 | Grimm | |
| 5,120,285 A * | 6/1992 | Grimm | B64C 13/28 475/205 |
| 5,518,466 A | 5/1996 | Tiedeman | |
| 6,299,108 B1 | 10/2001 | Lindstrom et al. | |
| 7,048,234 B2 | 5/2006 | Recksiek et al. | |
| 7,201,200 B2 | 4/2007 | Meyer | |
| 8,336,817 B2 * | 12/2012 | Flatt | B64C 13/28 244/99.2 |
| 2005/0151028 A1 * | 7/2005 | Pohl | B64C 13/26 244/213 |
| 2009/0108129 A1 | 4/2009 | Flatt | |
| 2009/0146015 A1 * | 6/2009 | Schievelbusch | B64D 45/0005 244/213 |
| 2011/0062282 A1 * | 3/2011 | Richter et al. | B64C 13/42 244/99.4 |
| 2012/0032030 A1 | 2/2012 | Ruckes et al. | |
| 2015/0083851 A1 * | 3/2015 | Moser | B64C 9/32 244/99.2 |
| 2015/0083855 A1 * | 3/2015 | Moser | B64C 9/16 244/1 N |

FOREIGN PATENT DOCUMENTS

| | | | |
|---|---|---|---|
| DE | 10 2010 047 540 A1 | 4/2012 | |
| EP | 0174820 A2 | 3/1986 | |
| EP | 0 215 211 A1 | 3/1987 | |
| EP | 1 052 168 A2 | 11/2000 | |
| EP | 1 321 359 A2 | 6/2003 | |
| EP | 1321359 A2 * | 6/2003 | B64C 13/28 |
| GB | 2469910 A | 11/2010 | |
| WO | 85/03126 A1 | 7/1985 | |
| WO | 00/29286 A1 | 5/2000 | |
| WO | 2012/045796 A1 | 4/2012 | |

* cited by examiner

DRIVE SYSTEM FOR CONTROL SURFACES OF AN AIRCRAFT

CROSS-REFERENCE TO RELATED APPLICATIONS

The present application claims the benefit of the filing date of U.S. Provisional Patent Application No. 61/681,169, filed Aug. 9, 2012, and claims priority from European Patent Application No. 12 179 891.2, filed Aug. 9, 2012, the disclosures of which are herewith incorporated herein by reference in their entireties.

TECHNICAL FIELD

The invention relates to a drive system for control surfaces of an aircraft.

BACKGROUND OF THE INVENTION

Flaps or flap segments located on the wings of a commercial aircraft are usually extended or retracted by means of a drive system, which comprises drive stations that are distributed inside the wings and connected to the flaps or flap segments through adjustment levers or other devices. Often, drive stations are operated through receiving rotational power from one or more drive units, which are also known as "Power Control Units" (PCU), by means of a transmission shaft that extends from the PCU into the respective wing of the aircraft. The drive stations thereby convert a rotary motion into a translatory motion. Each connection between the PCU and a drive station thereby constitutes a so-called load path through which the respective flap or flap segment can be moved and arrested. Such a drive system may also be used for moving slats or slat segments.

As the deployment of control surfaces is necessary for the operation of the aircraft, various failure cases need to be considered. Instead of designing main elements of the drive station for bearing higher loads usually mechanical load limiters are installed. In a load limiter, the individual load path extends through a pretensioned clutch with a ball ramp device that opens by being pushed apart if a predetermined maximum torque is exceeded.

For achieving a certain level of redundancy, commonly a mechanical coupling between adjacent flaps supports moving the flap that is located beyond the shaft break is provided. Consequently, when the coupling is used, the arising torque is much higher than for moving a single adjustment lever. Therefore, the design of the drive stations and the structure of the control surface is appropriately adapted. By providing a mechanical coupling between adjacent flaps it may become impossible to integrate a function for a differential flap setting.

DE 103 13 728 discloses a drive station that includes two drives connected via drive transmissions to one or more flaps or slats of a flap/slat group. The drives may be mechanically coupled to a rotational shaft, with a shaft brake arranged thereon.

Further, a skew detection system for use in sensing the occurrence of a skew condition in a system having a plurality of control surfaces is know, which comprises a linear detector arrangement extending over and movable with the surfaces between a first location on one of the surfaces and a second location on another of the surfaces, being connected to sensors that are able to detect a pulling force.

BRIEF SUMMARY OF THE INVENTION

An aspect of the invention may lie in proposing a drive system for moving control surfaces of an aircraft, e.g. flaps, flap segments, slats or slat segments, that does not rely on a mechanical coupling of adjacent control surfaces and, at the same time, provide at least the same degree of safety and reliability. Additionally, it should further be possible to reliably detect a failure in the drive system or skewed control surfaces.

A drive system according to an embodiment of the invention comprises at least one drive unit, at least one main shaft connectable to the at least one drive unit and at least one adjusting unit for each control surface to be driven. Each adjusting unit comprises a differential, two rotary actuators and at least one adjustment lever. The differential has at least one input means and two output means and is adapted for transferring torque from the at least one input means to the two output means. The input means thereby is couplable to the main shaft. Each of the two rotary actuators has a rotation input means and a motion output means. Furthermore, each of the rotation input means is coupled to one of the output means of the differential and the adjustment lever is coupled to the motion output means of both rotary actuators. If the adjustment lever comprises two load paths, the first load path may be connected to one of the output means and the second load path to the other output means. Alternatively, the output means of the rotary actuators are connected directly to the control surface or each output means is connected by its own adjustment lever to the control surface. In the latter case there will be at least two adjustment levers per adjustment unit.

The drive system is thereby based on the common concept of a driven shaft extending from one or more PCUs to the drive stations in the wing of the aircraft. Through rotation of the at least one shaft torque is transferred to the drive stations that are distributed inside the wing. Thereby, a single PCU may be used that is coupled to a main shaft. Further, two or even more PCU may be located in a center region of the fuselage and be connected to the main shaft or a plurality of main shafts. Also, a plurality of drive units may be distributed over the wing in a plurality of different locations and be connected to a plurality of shaft sections that may be connected to each other or operated independently from each other.

A special feature of the invention can be found in the use of a special adjustment unit having a differential gear instead of establishing a direct mechanical connection of the shaft and a rotary actuator.

In the context of the invention a differential gear is similar to a commonly known differential gear used in automobiles. Such a differential gear usually comprises a carrier that rotatably holds at least two sun gear wheels around a common middle axis. At least one planetary gear wheel is rotatable held on the carrier in a distance to the middle axis of the sun gear wheels, wherein the at least one planetary gear wheel has a rotational axis that is perpendicular to the middle axis of the sun gear wheels. Therefore, the at least one planetary gear wheel is guided along a peripheral path around the sun gear wheels, with the teeth of the at least one planetary gear wheel engaging the teeth of the sun gears. By rotating the carrier around the middle axis of the sun gear wheels a torque is transferable over the two sun gear wheels.

The differential gear may be designed to have a symmetrical shape such that a main shaft may extend through the differential gear completely and may connect to the carrier of the at least one planetary gear for delivering the torque.

For the purpose of driving more than just one adjustment unit the main shaft may extend over any desired length in order to be connected to further differential gears.

The output means of the differential can be any suitable object or device that is coupled to the sun gear wheels of the differential. It is not necessary that the output means are realized as gear wheels or the such as long as a torque can be transferred from inside the differential to the outside.

Hence, rotational power transferred by the main shaft is distributed to two load paths within an adjustment unit. Thereby, through this design at least one load path from the main shaft to the adjustment lever connected to a control surface can be maintained. An alternate load path based on a mechanical coupling of adjacent control surfaces is therefore not necessary any more. This allows for a differential displacement of adjacent control surfaces, leading to a clearly improved flight performance. As the coupling of adjacent control surfaces is not necessary, the single elements of the adjustment unit do not need to be designed for bearing excessive loads that occur when the alternate load path is used.

The rotary actuator may be realized by any suitable means that is able to transform a rotational motion into a translatory motion. The rotary actuator may therefore comprise a spindle gear with a threaded spindle engaging a threaded nut conducting a relative motion when a rotation is initiated at the nut or the spindle. The control surface to be moved is to be connected to the nut or the spindle to transfer the translatory motion to the respective connection of the control surface.

In an embodiment the at least one drive unit comprises at least one electric motor, which may be an AC or DC motor. Preferably, the electric motor is realized as a brushless DC motor connected to a motor control unit for generating a necessary voltage and current.

Alternatively, the at least one drive unit comprises at least one hydraulic motor, e.g. an axial piston motor having a movable swash plate for varying the displacement of the motor. By controlling the hydraulic pressure, a flow rate and the angle of the swash plate a rotational speed of the motor may be adjusted.

In another alternative embodiment the at least one drive unit comprises at least one motor powered by compressed air, which may be realized by bleed air or air taken from an air inlet or compressed by means of a separate compressor.

As known in the state of the art a central drive unit may comprise a combination of different motors, such as a combination of a hydraulic motor and an electric motor in a hybrid PCU, wherein both motors are connected to a speed summing differential having a common output shaft for providing rotational power.

In an advantageous embodiment the input means is a carrier for holding at least one planetary gear wheel of the differential, wherein the planetary gear wheel engages with two sun gear wheels. The carrier may thereby be realized as a frame, a cage or any other suitable component that preferably is balanced so as to not induce any vibration into the drive system. Exemplarily the carrier may comprise a support for rotatably holding a planetary gear wheel and preferably at least two planetary gear wheels. If a plurality of planetary gear wheels is to be used the respective supports should be distributed in an equidistant manner on the carrier.

In an embodiment at least one of the output means of the differential gear comprises a torque limiter coupled to a brake unit that. The torque limiter is adapted for adopting a first or a second operating state, wherein in the first operating state the torque limiter transfers a torque from a rotation input to a rotation output and wherein in the second operating state the torque limiter decouples the rotation input and the rotation output and acts on the brake unit. The torque limiter may preferably be realized as a ball ramp unit. The brake unit is furthermore couplable to a fixed structure of the aircraft. The ball ramp device, for example, is a mechanical component which is designed for transferring a torque below a predetermined threshold torque value and for being pushed apart under a torque exceeding the predetermined threshold torque value. The ball ramp device is connected to a rotatable input of the brake unit, wherein the brake unit is adapted for braking the rotatable input when the ball ramp is pushed apart. In other words, a ball ramp device is an automatically releasing clutch comprising two disks or rings with a profile having a rim like shape. Both disks or rings are facing each other and comprise indentations for holding balls in predetermined positions. The two rings or disks together with the balls are preferably held together by a spring. The profile shape and the indentations can be designed such that the ball ramp device is able to transfer a torque below a threshold torque with the balls being pressed onto edges of the indentations. Once the threshold torque is reached the spring is not able to apply a sufficient force to maintain the positions of the balls in their indentations such that they roll out and consequently push apart the disks or rings. Thereby, the ability to transfer torque directly through the ball ramp device is lost. Furthermore, during this separation motion the axial extension of the ball ramp device is increased. With one side of the ball ramp device being fixed to the differential and the other side to the brake unit a pressing force acts onto the brake unit such that interlinked or interwoven groups of lamellae are generating a friction force and lead to braking the rotation of the input. Thus, a simple load limiting function can be accomplished.

Preferably, the two output means comprise a torque limiter, e.g. a ball ramp device, coupled to a brake unit each, wherein the respective brake unit is couplable to a fixed structure in the aircraft. Thereby a reliable function can be assured.

In a preferred embodiment the torque limiter, e.g. a ball ramp device, is located between a sun gear wheel of the differential gear and the respective output means. Hence, once a threshold torque value is reached the respective output means is disconnected from the respective sun gear wheel and introduces a pressing force onto the brake unit.

In an alternate embodiment the torque limiter, e.g. a ball ramp device, may be located on a side of the output means that faces away from the respective sun gear wheel. This allows a more compact design of a section that includes the output means and the sun gear wheel as well as simplifies the retrofit or replacement of a ball ramp unit.

A clear advantage of this arrangement lies in the fact that the occurring load is limited before it enters the adjustment unit such that all components of the adjustment unit may be designed to conform the maximum torque of such a load limiting ball ramp unit. This leads to a clear reduction in weight of the drive system according to the invention. Furthermore, the two separate load paths are protected by means of just one single load limiting device. This is particularly the case when a ball ramp device activated brake is used. Through the coupling of both load paths at the adjustment lever, a jam case in one load path is coupled to the other load path. It thereby is ensured that the load limiter is activated independent from which load path experiences the jam.

In a still further embodiment, a torque limiter is arranged in a coupling region of the input means and the main shaft, wherein the torque limiter is adapted for adopting a first or a second operating state, wherein in the first operating state the torque limiter transfers a torque from the main shaft to the input means and wherein in the second operating state the torque limiter decouples the main shaft and the input means. Thereby, the torque may be transferred by the main shaft to other drive stations while in a jammed drive station the torque limiter conducts a decoupling in order to reduce the arising mechanical load.

In an embodiment, the differential comprises a differential lock for locking the differential once the output means rotate with different rotational speeds. Usually, in case one load path requires rotational power and the other one does not, usually one output gear wheel rotates loose. This generally undesirable side effect of a conventional differential, which e.g. leads to a loss of traction of a car on a road with a bad surface quality. By locking the rotation of one output gear to the other output gear, this effect can be eliminated.

In an exemplary embodiment the differential lock comprising a first locking body and a second locking body, wherein either the first locking body or the main shaft has a linear guiding means, wherein the first locking body is connected to a first component of the differential and has two end stops located on opposite ends of the first locking body, wherein the second locking body is slidably supported in the linear guiding means and has a locking thread, the locking thread engaging a thread of either the first locking body or the main shaft where the linear guiding means is not present. The locking thread corresponds to a thread on the first locking body or the main shaft. In case the main shaft rotates at the same speed as the respective output gear, the slidably supported second locking body is not rotated relative to the main shaft and the first locking body. In case the output gears experience different rotational speeds, indicating a drive failure, the second locking body starts to rotate relative to the main shaft or to the first locking body depending on whether the first locking body or the main shaft comprises the linear guiding means. During the rotation, the second locking body moves along the longitudinal axis of the main shaft thanks to the engaging threads. This axial motion can be maintained until the second locking body reaches one of the end stops of the bushing. A further motion is blocked and thereby the output means are mechanically coupled.

Advantageously, the first locking body is a bushing, wherein the linear guiding means is arranged on one of the main shaft and ain inner surface of the first locking body, and wherein the locking thread is arranged on one of an outer surface of the second locking body and of an inner surface of the second locking body.

For example, the first locking body is a bushing having a thread on an inner surface, wherein the linear guiding means is arranged on the main shaft and wherein the second locking body is a nut with the locking thread being arranged on an outer surface thereof. The nut is thereby guided by the main shaft and moves along the main shaft depending on its relative rotation to the bushing.

Alternatively, the first locking body is a bushing, wherein the linear guiding means is arranged on an inner surface of the bushing, and wherein the second locking body is a nut with the locking thread being arranged on an inner surface thereof engaging a thread on the main shaft. In other words, the nut is slidably supported in the linear guiding means and has an inner thread, which engages an outer thread of a portion of the main shaft. This differential lock is designed similarly to the previously presented differential lock but is located in another section of the differential gear. The overall dimensions of the differential are very compact.

In an embodiment the first locking body is a bushing having a thread-like groove structure on an inner surface, wherein a threadless shaft carries the at least one body of rotation as a second locking body movably engaging with the thread-like groove structure of the first locking body. The combination of the body of rotation and the thread-like groove structure of the first locking body may lead to a precise longitudinal motion with a low friction. The body of rotation may thereby be realized as a ball, an ellipsoid, a hyperboloid or any other suitable shape.

In a still further embodiment the first locking body is a bushing, wherein the linear guiding means are bars parallel to the shaft and connected to the first locking body, wherein each bar carries at least one body of rotation with a bore hole through its center sliding on the bar as second locking body, engaging a thread-like groove structure of the main shaft. Again, the body of rotation may be realized as a ball, an ellipsoid, a hyperboloid or any other shape.

It is advantageous to connect the first locking body to one of the output means. Thereby a relative rotation of the sun gears and the main shaft may easily be monitored by the longitudinal motion of the second locking body for detecting a failure.

Alternatively, the at least one of the first locking bodies is fixedly connected to the carrier and rotably to a planetary gear wheel, wherein the at least one main shaft is rotably connected to one of the carriers and fixedly to the planetary gear.

In a further exemplary embodiment the first locking body is coupled to one of the input means and a planetary gear wheel such that the differential lock is activated once the planetary gear wheel rotates relative to the input means.

In a further exemplary embodiment, the end stops comprise sensors that sense the second locking body pressing onto the respective end stop. By this measure, it can be detected when a failure case occurs. This eliminates the probability of using a drive system which is already degraded in it operability.

It is apparent that the brake and the differential lock may also be used in a combination, with a ball ramp connected to one output gear wheel activates the brake in order for limiting the load. By this combination, both respective failure cases may be detected by a torque limiter lockout without additional sensors.

In another embodiment, the differential comprises two torque limiters, e.g. ball ramp devices, wherein each of the torque limiters is connected to one of the output gears and one brake.

In another embodiment the differential comprises a differential lock for each planetary gear wherein the differential lock is located on the carrier and connected to the respective planetary gear. Depending on the number of planetary gear wheels and their design the respective differential lock may be designed to bear a much lower load compared to one main differential lock connected to an output gear wheel.

Additionally to the differential lock located on the carrier a torque limiter, e.g. a ball ramp device, may be used additionally to a brake.

In a still further embodiment the torque limiter between the main shaft and the input means is combined with differential locks located on the carrier. As an alternative to the torque limiter coupled with the main shaft shear pins may be used to connect the main shaft and the carrier of a differential. After an access load is present the shear pins break and the differential is disconnected from the main shaft.

In a still further embodiment the shear pin connection between main shaft and carrier may be present additional to a differential lock located between one main output gear wheel and the main shaft. The differential lock may also be positioned on the carrier.

In a still further embodiment at least one rotational sensor is arranged in the differential to detect a differential motion between at least two components of the differential, e.g. for detecting a skew of control surfaces, wherein the drive system comprises two adjusting units. For minimizing the number of necessary sensors and consequently for minimizing the complexity of an electronic evaluation unit for evaluating sensor signals of the drive system, it is advantageous to attach a rotary sensor, such as a rotary variable differential transformer (RVDT) to the differential such that a relative rotation between the main shaft and at least one of the output gear wheels and/or between the carrier and at least one of the planetary gear wheels is detectable. If necessary according to official airworthiness regulations a plurality of identical or different rotary sensors may be integrated for achieving a certain redundancy.

The rotary sensor may thereby be connected to an evaluation unit arranged in the aircraft. The evaluation unit may be integrated in an existing control unit and preferably in a slat flat control computer (SFCC) or a similar unit. In case the evaluation unit detects a rotation measured by the rotary sensor a signal may be generated and displayed as a warning in the cockpit. The signal may furthermore be used for switching into an emergency operation mode, e.g. accompanied by activating wing tip brakes and interrupting the drive of a drive unit.

Furthermore, the evaluation unit may be adapted for recognizing a skew of a control surface by comparing the rotation of components of at least two differentials, preferably two differentials associated with the same control surface.

In an alternative embodiment, which comprises a differential lock with a bushing and a nut as explained above, at least one proximity sensor may be integrated in the differential lock to sense the approach of the nut and the end stops of the differential lock. Signaling the approach of an end stop is a reliable measure of an activation of the differential lock as a result of a failure in the drive system.

In another alternative embodiment, which comprises a differential lock with a bushing and a nut as explained above, at least one linear motion sensor may be integrated in the differential lock to sense the motion of the nut relative to the bushing or the carrier. Preferably the sensor may be a linear variable differential transformer having three coils positioned around the bushing while the nut may be designed or connected to a soft iron core.

In a further embodiment the adjustment unit is realized as a rotary actuator in which at least one differential as explained above is integrated.

A still further drive system may comprise at least one source of polarized light directing polarized light onto at least one component of at least one differential, and at least one imaging device connected to an evaluation unit and directed to the at least one component, wherein the evaluation unit is adapted for detecting changes of mechanical stress of the respective component. Thereby, material stress may be analyzed by using polarized light directed onto a surface of differential gear components, while a camera or another imaging device observes the surface of the respective gear components. An evaluation unit, preferably based on one or more neural networks, may evaluate the acquired image information for detection of a sudden rise or drop of mechanical stresses as an indication of a break or any other failure. A camera, where the polarization filter is directly located on the CCD or CMOS of the camera, is preferred. Such camera may modify a measuring arrangement for observing strain by speckle effect / speckle interferometry.

Furthermore, speckle interferometry may be used to measure mechanical strain.

Also, the drive system may comprise at least one fibre-bragg-grid, which is inserted into at least one component of at least one differential together with at least one monochromatic, coherent light source, and at least one detection device connected to an evaluation unit for detecting changes of mechanical stress/strain of the respective component.

The invention further relates to an aircraft having a wing with a plurality of control surfaces that are movably connected to the wing by means of a drive system above.

For example, these control surfaces may be realized as flaps arranged on the trailing edge or the leading edge of the wing as well as slats. Each control surface comprises u≥1 rotary actuators. Each rotary actuator comprises n>1 gear modules and has m≥n≥1 connections to the control surface. With this setup basically two failure cases may occur. (1) In l≥1 gear modules a jam occurs such that the respective control surface is blocked. (2) k≥1 links between rotary actuators and control surfaces are lost such that the respective control surface experiences an asymmetric load.

During failure case (1) the drive system may conduct a method or process consisting of: (I) automatic de-coupling of blocked gear components, e.g. through a ball ramp device; (II) detection of the jam case; (III) analysis of the state of the high lift system by means of an evaluation unit, preferably a SFCC (Slat Flap Control Computer); (IV) de-coupling further differentials driven by the main shaft for preventing asymmetric loads, e.g. by actuators, driven through piezo elements like artificial muscles, whereby artificial muscles with nanofibrillated electrodes are preferred; (V) activation of the load limiters, brakes or other devices for reducing the load of the remaining rotary actuators by means of a control unit and preferably the SFCC; and (VI) alternatively or additionally the control unit initiates the reduction of provided rotary power of at least one PCU for reducing the load on the remaining rotary actuators. By providing feasible sensors the steps (I) and (IV) may be combined.

During failure case (2) the drive system may conduct a method or process consisting of: (A) automatically blocking the respective differential with optional de-coupling of a broken gear component; (B) detection of a standing or overrunning gear component of the differential; (C) analysis of the state of the high lift system by means of an evaluation unit, preferably an SFCC; (D) de-coupling further differentials driven by the main shaft for preventing asymmetric loads; (E) activation of the load limiters, brakes or other devices for reducing the load of the remaining rotary actuators by means of a control unit and preferably the SFCC; (F) alternatively or additionally the control unit initiates the reduction of provided rotary power of at least one PCU for reducing the load on the remaining rotary actuators. By providing feasible sensors the steps (A) and (D) may be combined.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

FIG. 1a shows the basic principle of a drive system with a plurality of differentials, while

DETAILED DESCRIPTION

Figure 1A:
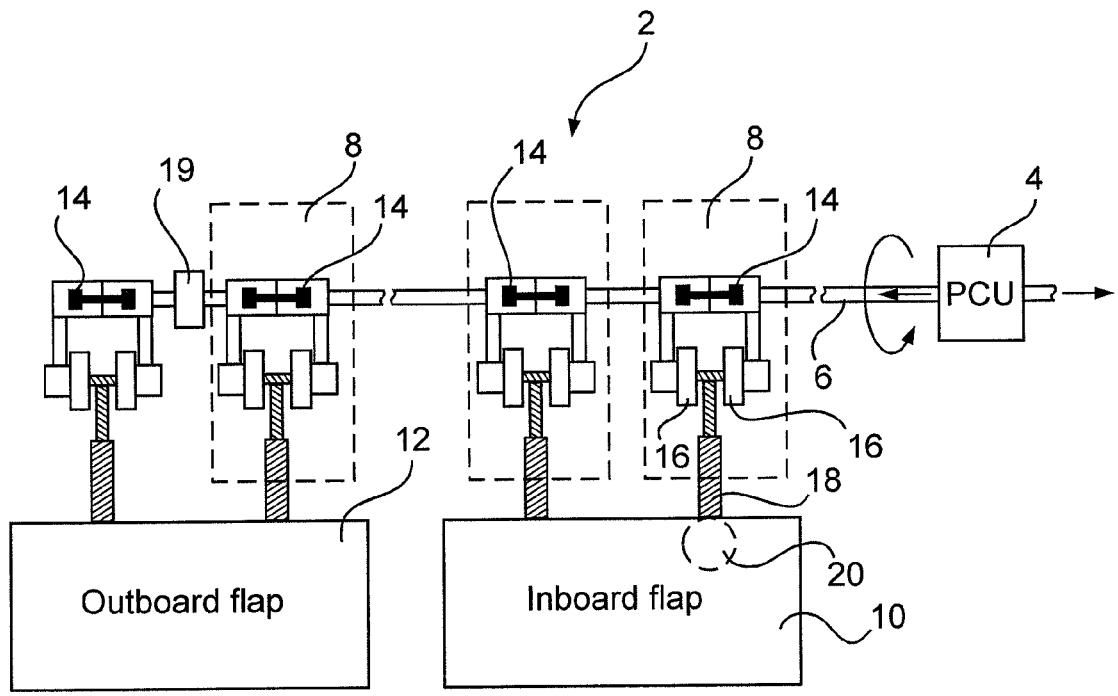

FIG. 1a shows the basic principle of a drive system 2 according to an embodiment of the invention. Usually, an aircraft is of a symmetrical shape about a longitudinal axis and comprises a central drive unit (PCU) 4 near the longitudinal axis for moving control surfaces of a high lift system. For the purpose of simplification, FIG. 1a shows only half of an exemplary drive system 2 for one of two wings (not explicitly shown) of an aircraft, including the power control unit 4.

From the drive unit 4a main shaft 6 extends into the wing and exemplarily extends through a plurality of adjusting units 8 along its extension to which the main shaft 6 is connected. Exemplarily two control surfaces in form of flaps 10 and 12 are depicted that are located at a trailing edge of the wing. As an example, the flap 10 is realized as an "inboard flap", whereas the flap 12 is realized as an "outboard flap". Each one of the flaps 10 and 12 is driven by two adjusting units 8, wherein the two adjusting units 8 are located at a distance in lateral direction to each other.

Each adjusting unit 8 comprises a differential 14 connected to the main shaft 6 for receiving an input torque, and is connected to two rotary actuators 16 for outputting torque. Exemplarily both rotary actuators 16 from each adjusting unit 8 are arranged relative to each other, e.g. facing each other, such that one end of an adjustment lever can be connected to both rotary actuators 16 at the same time.

The adjustment lever 18 extends to a connection section 20 of the respective flap 10, 12 and may be connected in a swivelable manner, for example on a fork, a flange or any other feasible joint that enables the introduction of a motion force from the adjusting lever 18 onto the respective control surface 10 or 12. Through the rotation of the main shaft 6, all differentials 14 are supplied with a torque. If the drive system 2 is without any failure and if none of the control surfaces 10 or 12 is jammed or skewed, the differentials 14 transfer or distribute the torque and the rotating motion to two rotary actuators 16 each. Consequently, the rotary actuators 16 move the respective adjustment lever 18, which adjustment lever 18 thereby moves the respective flap 10 or 12 along a predetermined motion path depending on the support of the flap 10 or 12.

By this measure, each adjustment unit 8 provides two individual load paths from the main shaft 6 to a respective adjustment lever 18. While the differential 14 usually distributes equal parts of the incoming torque to the connected rotary actuators 16 a degraded torque transfer to one rotary actuator 16 is still possible in case one of a failure of the other rotary actuators 16.

In FIG. 1a a general setup of a drive unit 4 in form of a PCU together with a single main/transmission shaft 6 is shown. In this example, the main shaft 6 basically extends through the entire length of the high lift system such that each adjusting unit 8 is connectable to the main shaft 6. The main shaft 6 may be separated into smaller sections connected to each other by joint assemblies to prevent a shaft brake on elastic wing deflections. For the purpose of arresting the control surfaces in an extended or retracted position usually at least one wing tip brake 19 is positioned in the wing and connected to the main shaft 6. Thereby, any returning force acting on the control surfaces 10 or 12 can be transferred into the wing structure of the aircraft instead of driving the main shaft 6.

As FIG. 1a merely shows the basic principles, not all failure cases and additional features can be gathered therefrom. In the following figures preferred embodiments are presented that may be part of the drive system 2 according to FIG. 1a.

Figure 1B:
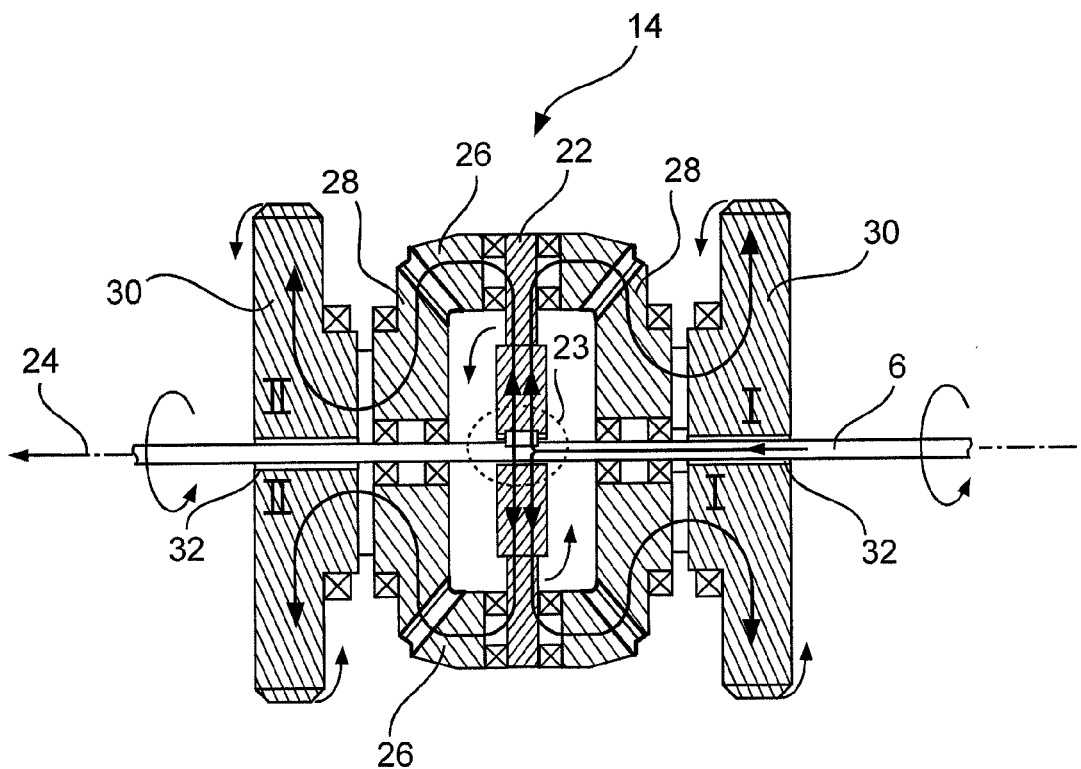
FIG. 1b shows a single differential in a sectional view.

For the purpose of clarification, FIG. 1b shows an exemplary basic design of a differential 14. Here, a carrier 22 as an input means is connected to the main shaft 6 by a shaft-hub-connection 23 such that the carrier 22 follows the rotation of the main shaft 6. Distanced from a longitudinal axis 24 of the main shaft 6 the carrier 22 holds two planetary gear wheels 26 in a rotatable manner, e.g. by means of bearings. Additionally, two sun gear wheels 28 are rotatably held concentrically to the main shaft 6, wherein central axes of the sun gear wheels 28 align with the longitudinal axis 24 of the main shaft 6. Two output gear wheels 30 as output means are connected to the sun gear wheels 28 such that they follow the rotation of the respective sun gear wheel 28. In this example, the main shaft 6 extends through the whole differential 14. For leading the main shaft 6 through, the output gear wheels 30 have a bore hole 32 located in their center with a diameter sufficiently exceeding the diameter of the main shaft 6.

On rotation of the main shaft 6, the carrier 22 follows the rotation and thereby moves the planetary gear wheels 26 in a peripheral direction around the longitudinal axis 24. Due to the engaging connection between planetary gear wheels 26 and the sun gear wheels 28, the latter simply follow the motion of the planetary gear wheels 26 as long as a torque can be applied to both output gear wheels 30. Hence, a first load path I is generated to transfer torque from the main shaft 6 to the right output gear wheel 30 and a second load path II is generated to transfer torque from the main shaft 6 to the left output gear wheel 30 as indicated in FIG. 1*b*.

As indicated the torque may only be transferred to both output gear wheels 30 when there is a sufficient counter-torque on both output gear wheels 30, in case of the invention by the counter-force of the adjustment lever 18 acting on the rotary actuators 16. In case one of the load paths I or II experiences a failure through which the torque transfer is not possible at least in one of the load paths I or II, e.g. through a break in one of the output gear wheels 30, the rotation will be transferred to a part of the adjustment unit 8 where the least resistance for rotation occurs. Since one end of the adjustment lever 18 is attached to both load paths I and II their resulting motion outputs are coupled and the adjustment lever 18 will still be moved.

In case of an overload, for example generated by a completely immovable adjustment lever 18, it may be advantageous to provide a protection means to prevent additional failures in the drive system 2 or the respective differential 14. In the following, different protection mechanisms are provided for different failure cases.

Figure 2:
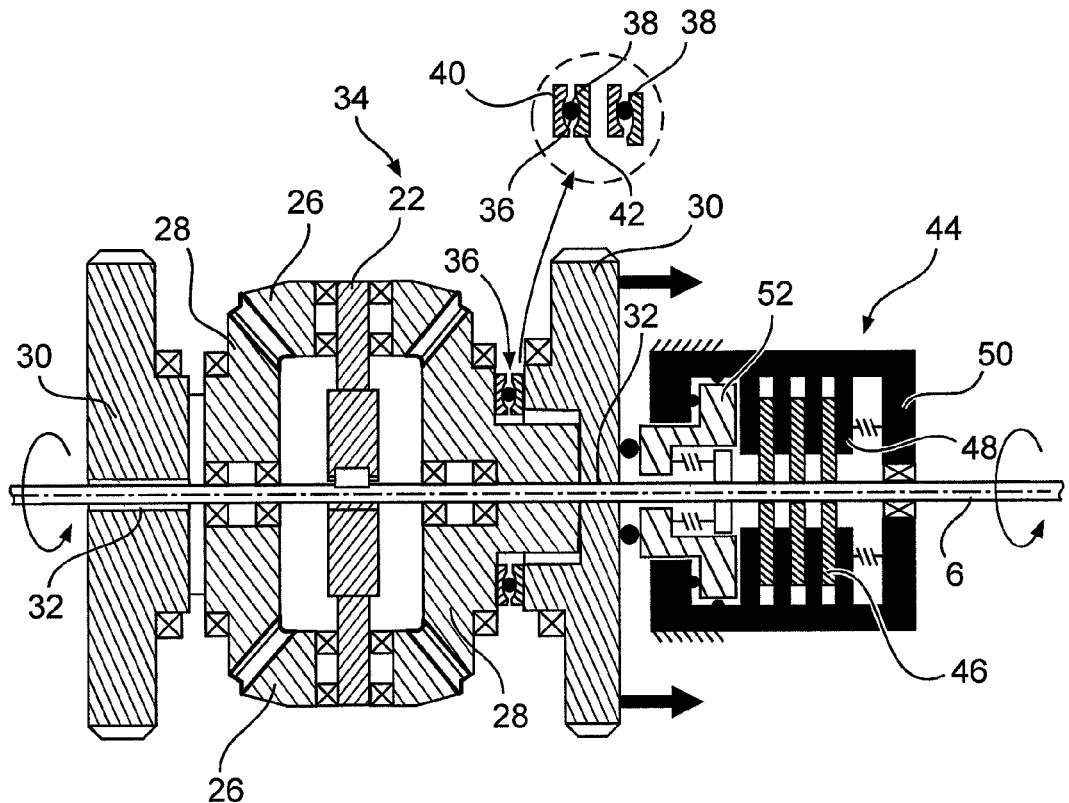
FIG. 2 shows a modified differential with a ball ramp device between a sun gear and an output gear wheel and a brake connected to the output gear wheel in a sectional view.

FIG. 2 demonstrates a modified differential 34 having a ball ramp device 36 arranged between the right output gear wheel 30 and the right sun gear wheel 28 such that only a predetermined maximum torque may be transferred from the right sun gear wheel 28 to the right output gear wheel 30 depending on the design of the ball ramp device 36.

As indicated in a small section above the drawing of the differential 34, balls 38 are held between two rings 40 and 42 comprising a rim-shaped design with indentations for holding balls 38. The rings 40 and 42 are facing each other with their concave surfaces. During a normal operation, i.e. when the torque to be transferred is below a previously chosen, predetermined maximum torque, the balls 38 stay inside their respective indentations. Thereby, the rings 40 and 42 maintain their relative positions and torque may reliably be transferred between the rings 40 and 42. This may further be improved by securing the relative positions of the rings 40 and 42 by means of a spring. Once the torque to be transferred exceeds the above mentioned predetermined maximum torque, the balls 38 leave their respective indentations such that, as indicated in the small section above the drawing of the differential 34, the balls leave their indentations in a radial direction and, thanks to the rim-shaped profile of the rings 40 and 42, they separate the rings 40 and 42, i.e. push them away from each other. Thereby, the extension of the ball ramp 36 in an axial direction of the differential 34 increases. Thereby, a axially directed pressing force is generated, which can be used to operate a brake 44 connected to the right output gear wheel 30.

The brake 44 exemplarily comprises two independent sets of lamellae 46 and 48. The first set of lamellae 46 is fixed to the main shaft 6 such that it directly follows the rotation of the main shaft 6. The second set of lamellae 48 is located inside a carrier 50, which carrier 50 is preferably attached to a fixed structural part of the aircraft. The brake 44 further comprises an axially movable actuating device 52 located inside the carrier 50, which is adapted for pressing the interweaving sets of lamellae 46 and 48 together. Thereby, the friction between the lamellae 46 and 48 is drastically increased and substantially the whole torque present at the main shaft 6 is transferred to the fixed structure of the aircraft. The actuating device 52 is connected to the right output gear wheel 30 such that once the predetermined maximum torque is exceeded and the ball ramp 36 is extended in an axial direction, it automatically conducts the braking function.

This has the technical effect that when a jamming occurs in the differential 34 or at the adjustment lever 18, accompanied by an increase of torque in the differential 34, automatically the torque to be transferred is limited and transferred away from the respective adjustment unit. Thereby, all adjustment units 8 of the drive system according to an embodiment of the invention can be designed to respect the predetermined maximum torque and do not need to be oversized to bear additional loads as common in the prior art. Further, only one load limiting brake may be sufficient for two load paths over one adjustment unit 8.

It is apparent that the differential 34 may be further modified such that a second ball ramp 36 is located between the left output gear wheel 30 and the left sun gear wheel 28 and to provide an additional brake 44 attached to a left side of the left output gear wheel 30.

Figure 3A:
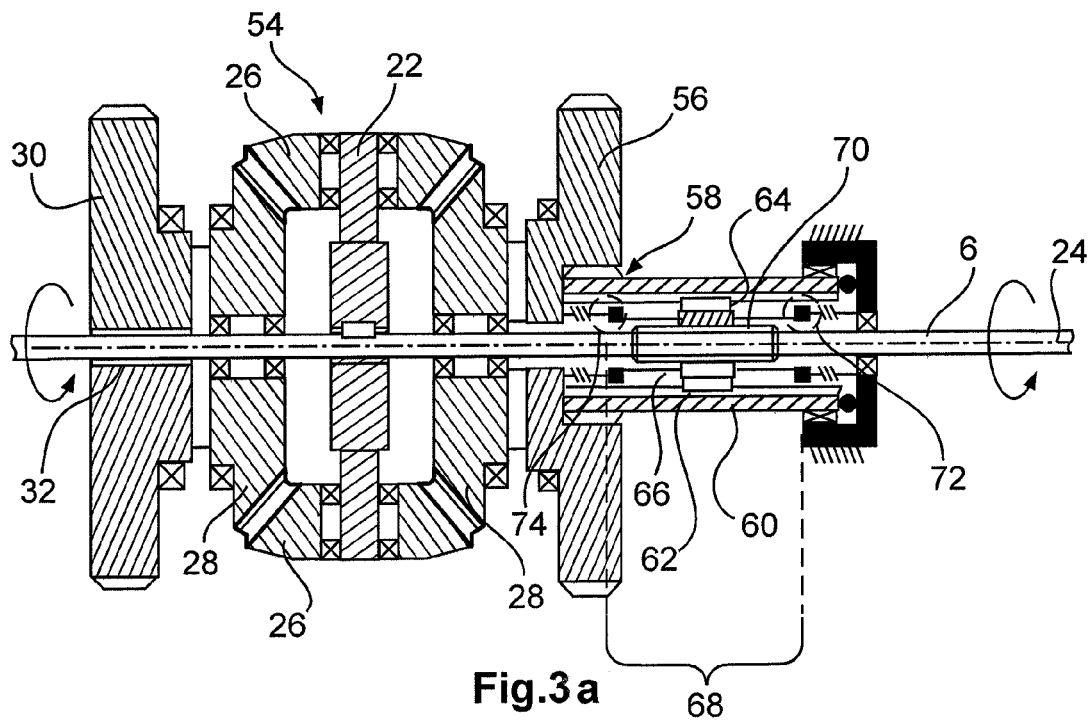
FIG. 3a shows a differential with an automatic differential lock connected to an output gear wheel in a sectional view, wherein additional embodiments for a differential lock are shown in FIGS. 3b, 3c, 3d and 3e.

FIG. 3*a* shows another differential 54 that is based on the differential 14 of FIG. 1*b* and comprises a modified output gear wheel 56, exemplarily located on the right side of the differential 54 in FIG. 3. The modification lies in a connection 58 with a bushing 60 as a first locking body that extends in an axial direction parallel to the longitudinal axis 24 of the differential 54. Inside the bushing 60 a linear guiding means 62 is arranged, for example by means of indentations, an elongated recess or any other feasible means that allow guiding an object in a direction parallel to the longitudinal axis 24. A nut 64 as a second locking body is slidably supported in the linear guiding means inside the bushing 60 and comprises an inner thread 66. A section 68 of the main shaft 6 comprises a local thickening with an outer thread 70 engaging the inner thread 66 of the nut 64. Alternatively to the nut a ball or a plurality of balls with a bore hole through the center, which are linearly guided by sliding bars and connected to the bushing 60 and parallel to the shaft 6, may be used. The thread of the shaft thereby should substantially match the diameter of the respective ball. Also, to maintain redundancy more than one ball per bar may be used. Furthermore, instead of a ball other bodies of rotation like ellipsoid of rotation, hyperboloid, ovoid bodies may be used.

As the above described exemplary embodiment is only an example it is clear that the thread 70 may also be present at an inner surface of the bushing 60 while the linear guiding means 60 may be present at the main shaft 6, such that the nut 64 may engage the linear guiding means on its inner surface and may comprise a thread on its outer surface to engage the thread on the inner surface of the bushing 60.

Again, alternatively to the nut 64 a ball with a bore hole through its center may be used, whereby the thread of the bushing should substantially match the diameter of the ball. Also, to maintain redundancy more than one ball per shaft 6 may be used. Furthermore, instead of a ball other bodies of rotation like ellipsoid of rotation, hyperboloid, ovoid bodies may be used.

As long as the main shaft 6 and the output gear wheel 56 rotate with the same rotational speed, the bushing 60, consequently the nut 64 and the main shaft 6 do not conduct a relative rotation to each other. Therefore, during the normal operation and a normal transfer of torque from the main shaft 6 to the output gear wheels 30 and 56, the nut 64 does not change its position along the longitudinal axis 24. In case a failure occurs, e.g. a break of a component inside the differential 54 or of one of the rotary actuators 16, a full torque transfer from the main shaft to both output gear wheels 30 and 56 cannot be guaranteed. In such a case usually one output gear wheel 30 that does not counteract the torque to be transferred, rotates alone if an end of the respective adjustment lever 18 is not connected to both rotary actuators 16 connected to the differential 54 at the same time. If this happens, there will consequently be a difference in the rotational speeds of the main shaft 6 and the output gear wheel 56. Hence, due to the relative rotation of the main shaft 6 and the ring 64, the latter will be moved in an axial direction along the linear guiding means 62 until an end stop 72 on the right side or an end stop 74 on the left side is reached resulting in a mechanical, clamping connection between the main shaft 6 and the output gear wheel 56. The differential 54 thereby has an automatic differential lock.

As explained above and further shown in FIG. 3b, instead of a nut also a pairing of a rotating body 65, guided along the main shaft 6 by means of linear guiding means 71 attached thereto, and a corresponding thread 67 in a surrounding bushing 69 may be used for providing a differential locking function. Depending on the design of the rotating body 65 the probability of jamming the thread 67 is less than with a much smaller nut and a thread with a smaller thread pitch.

Figure 3B:
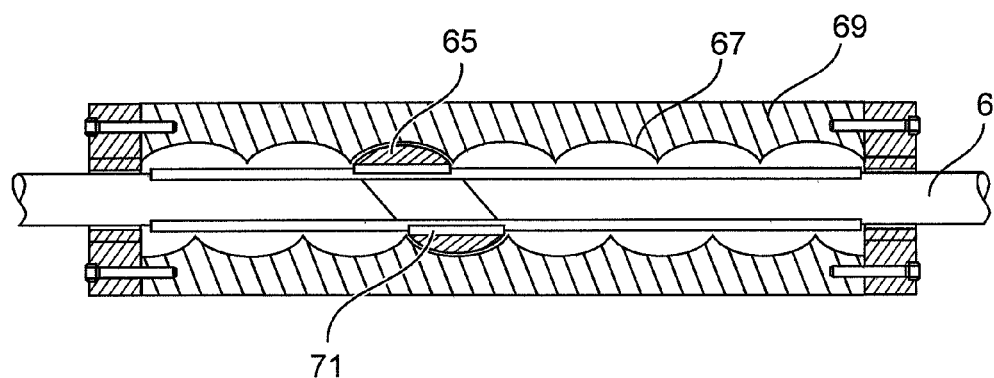
Figure 3C:
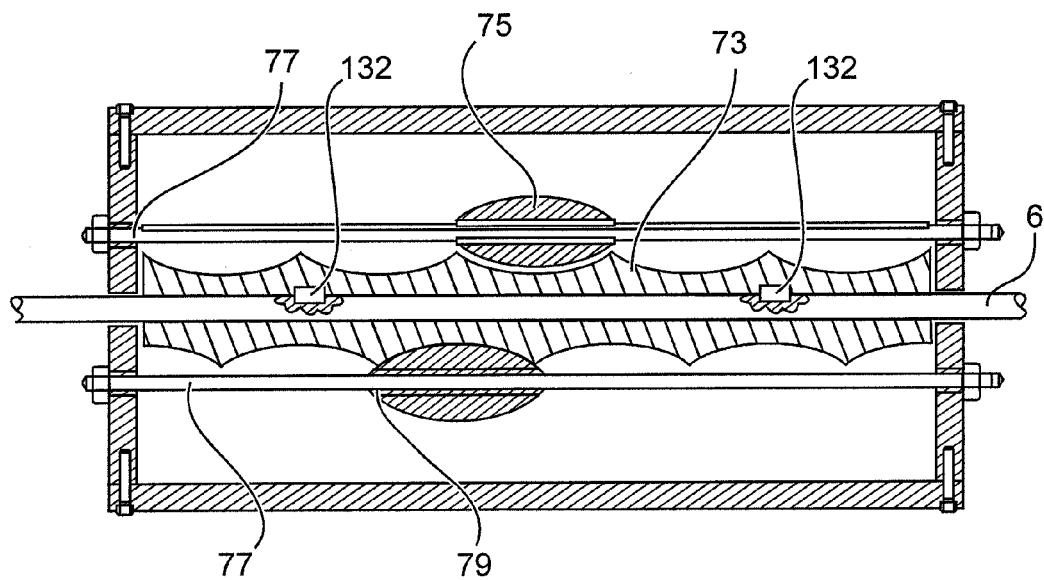

Also, such a thread 73 may be integrated into the main shaft, as depicted in FIG. 3c, while a rotating body 75 is guided along slider bars 77 parallel to a longitudinal axis of the main shaft 6. For this purpose, the rotating body 75 comprises bore holes 79 for leading the slider bars 77 through.

Figure 3D:
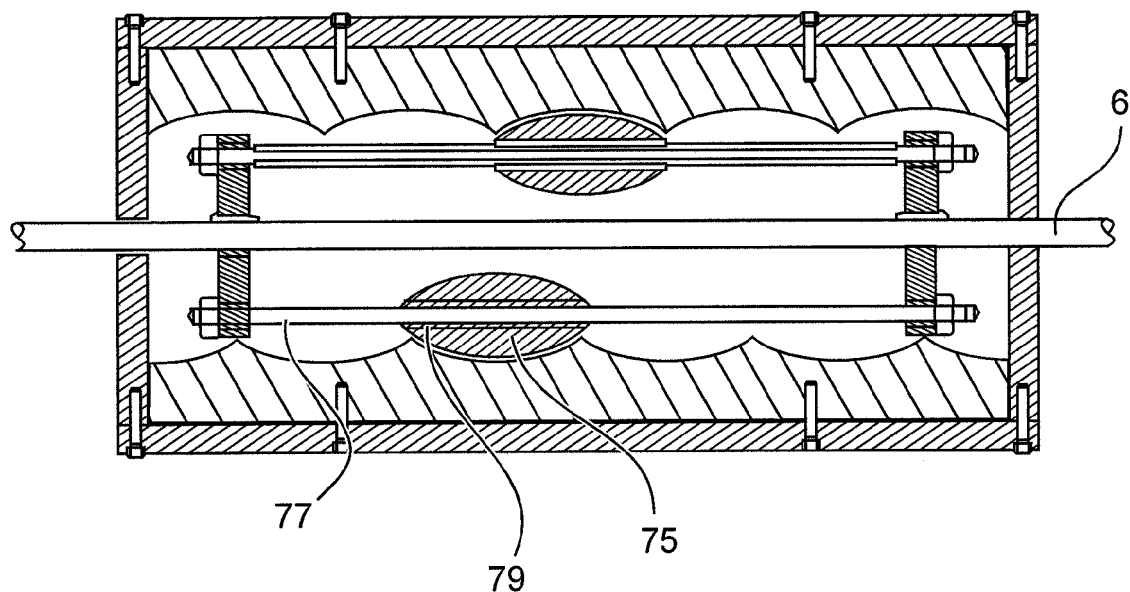

Alternatively, the rotating body 75 may engage with an outer thread comparable to the outer thread 67 as shown in FIGS. 3b and 3d, in combination with a slider bar guiding function, wherein the slider bars 77 are rotated with the main shaft. The slider bars 77 may also be realized with or without guiding means. A combination of a single slider bar with a additional linear guiding means, the use of two distanced slider bars without slider bars and the use of two slider bars having linear guiding means may also be possible.

Figure 3E:
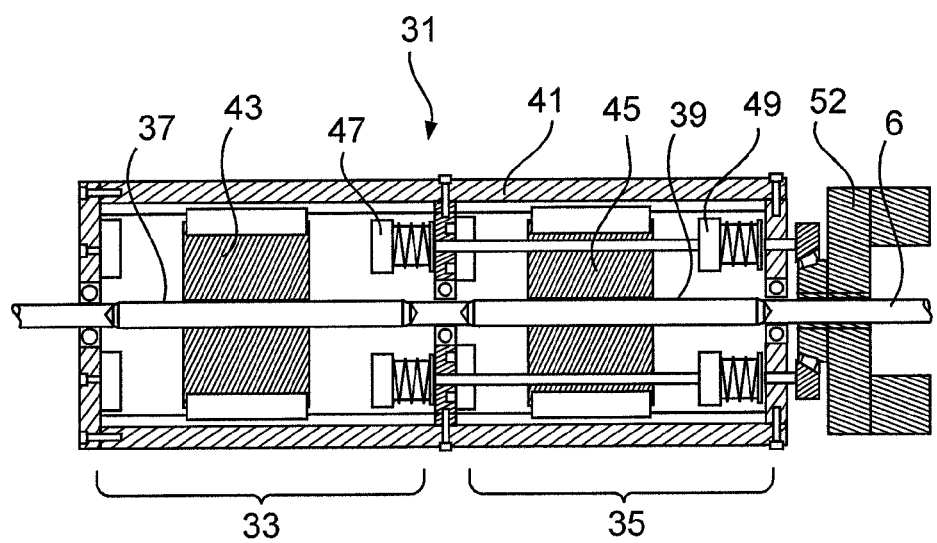

Furthermore, the differential lock function may be rendered more efficient with a differential lock 31 as shown in FIG. 3e. Here, the main shaft 6 comprises two sections 33 and 35 comprising a thread with an opposite pitch. Once a relative rotation between the main shaft 6 and a bushing 41 occurs, two nuts 43 and 45 are moving along the main shaft 6 until they reach an end stop. A pressing force onto a brake actuator 52 is transferred by spring loaded pistons extending to the brake actuator 52 and facing to each of the nuts 43 and 45. Due to the opposite pitch of the threads 37 and 39 each direction of rotation of the main shaft 6 relative to the bushing 41 a piston is pressed upon such that the brake actuator 52 is moved.

Figure 4:
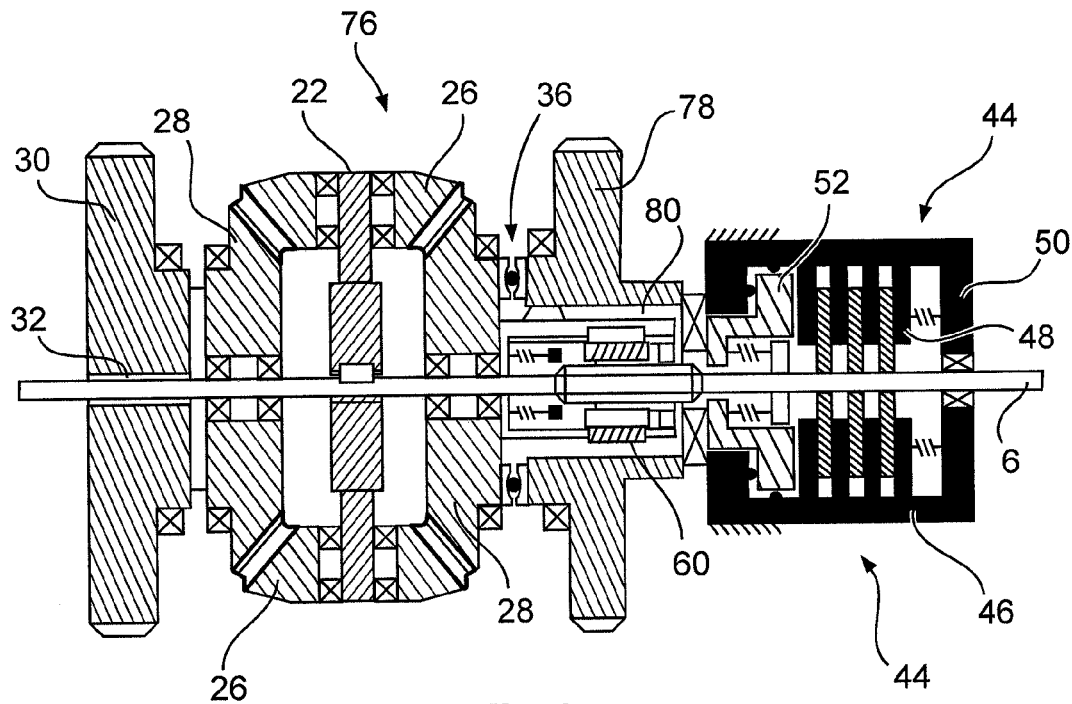
FIG. 4 shows a differential with a ball ramp device, an automatic differential lock and a brake connected thereto in a sectional view.

As demonstrated in FIG. 4, the torque limiting function of FIG. 2 may be combined with the automatic differential lock shown in FIG. 3a. Thereby, a differential 76 may be equipped with a ball ramp device 36 connecting the right sun gear wheel 28 with the right output gear wheel 78, which output gear wheel 78 comprises a recess 80 for receiving the bushing 60, wherein the outer side of the output gear wheel 78 is connected to the actuating device 52 adapted for providing the braking function within the brake 44. Between bushing 60 and the right output gear wheel 78 a hub-shaft connection is indicated. A ring between bushing 60 and the actuating device 52 is adapted for activating the brake once the nut 66 reaches it.

Furthermore, it may be feasible to add two ball ramp devices on both sides of the differential 76.

Figure 5:
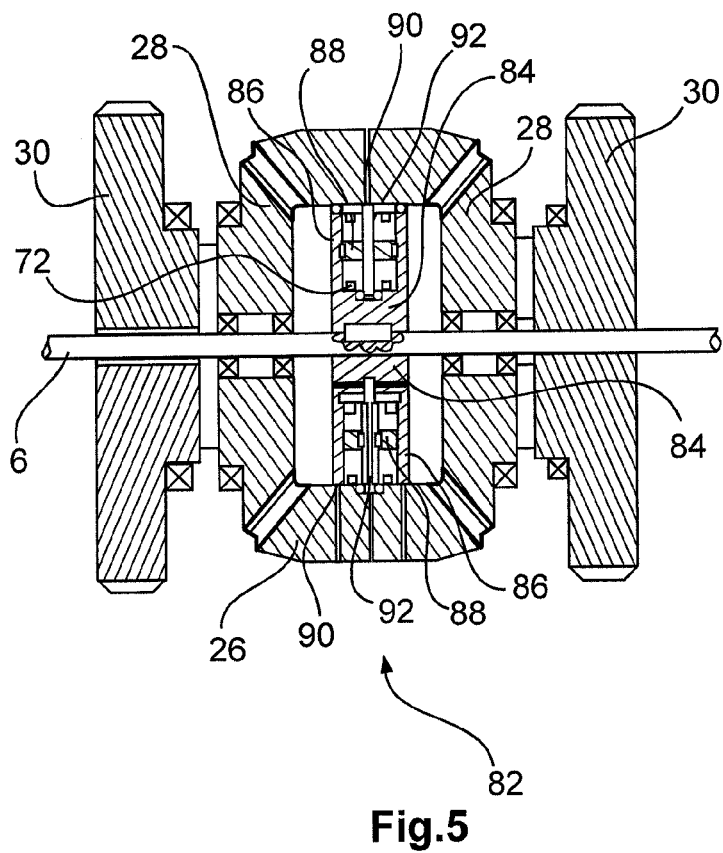
FIG. 5 shows a differential with automatic differential locks connected to planetary gears in a sectional view.

FIG. 5 shows a further differential 82 that comprises similar differential locking elements as shown in FIGS. 3a to 3e and 4 but a different arrangement within the differential 82. Here, a carrier 84 comprises bushings 86 that rotatably hold a planetary gear wheel 26 each, from which planetary gear wheel 26 a threaded connection shaft 92 extends into the bushing 86 and is engaged with a nut 88. The latter comprises an inner thread 90 that engages the threaded connection shaft 92. The nut 88 may be slidably supported in linear guiding means inside the bushing 86. Alternatively the bushing 86 comprises an inner thread, the ring 88 an outer thread, the shaft 92 linear guiding means and the nut 88 may engage in linear guiding means of the connecting shaft 92. These arrangements are exemplarily-provided for both planetary gear wheels 26, while a mixed constellation is possible.

By rotation of the main shaft 6, the carrier 84, which is connected to the main shaft 6, moves the planetary gear wheels 26 in a peripheral direction. If both output gear wheels 30 transfer torque, the planetary gear wheels 26 only engage with the sun gear wheels 28 but do not conduct a rotating motion. Thereby, the shaft 92 does not rotate. In case of an asymmetric rotation of the output gear wheels 30, the planetary gear wheels 26 start to rotate and, consequently, the rings 88 are moved along the linear guiding means in the bushing 86. On reaching an end stop the further rotation of the planetary gear wheel 26 is prevented and the differential 82 is locked. It may be possible to equip only one of the planetary gear wheels 26 with such an arrangement for locking the differential 82.

Figure 6:
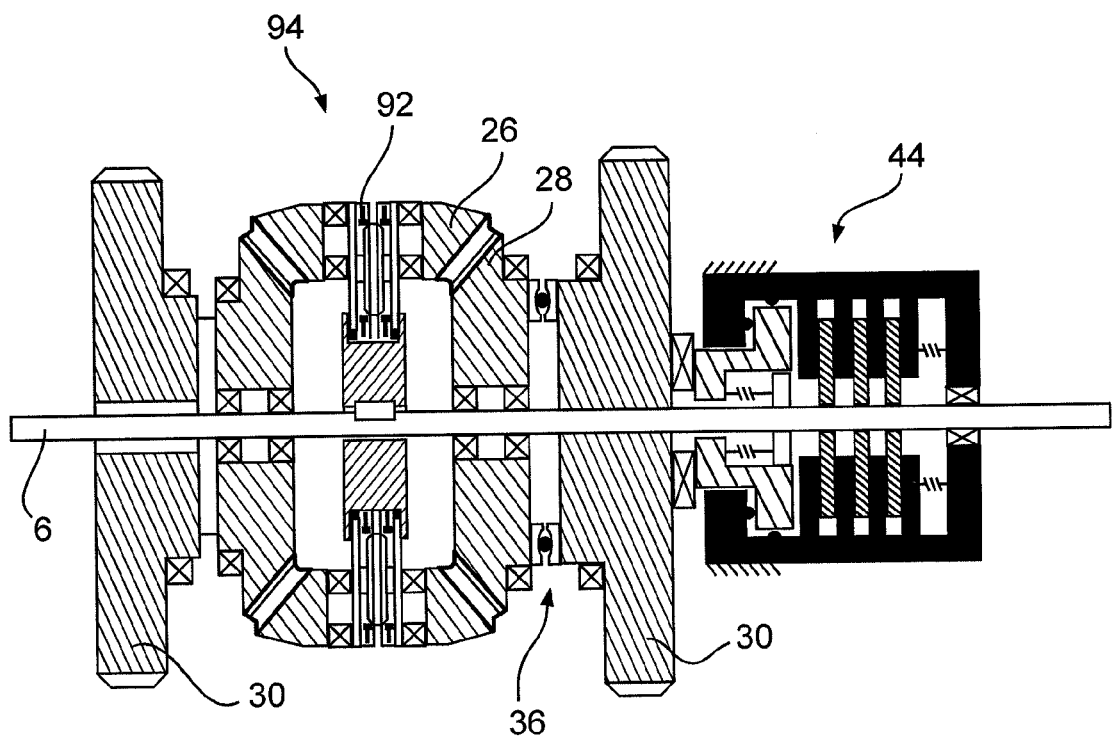
FIG. 6 shows a differential with automatic differential locks connected to planetary gears, a ball ramp device and a brake in a sectional view.

In analogy to FIG. 4 a combination of differentials 82 and 34 is also possible as depicted in FIG. 6. Here, the planetary gear wheels 26 are connected to a shaft 92 with an outer thread engaging an inner thread 90 of a ring 88, which ring 88 is slidably supported in a bushing 86 arranged on a carrier 84. Furthermore, in the depicture of FIG. 6 the right sun gear wheel 28 is connected to a ball ramp 36 for providing an actuation of a brake 44 if the applied torque through the main shaft 6 exceeds a predetermined maximum torque.

Figure 7:
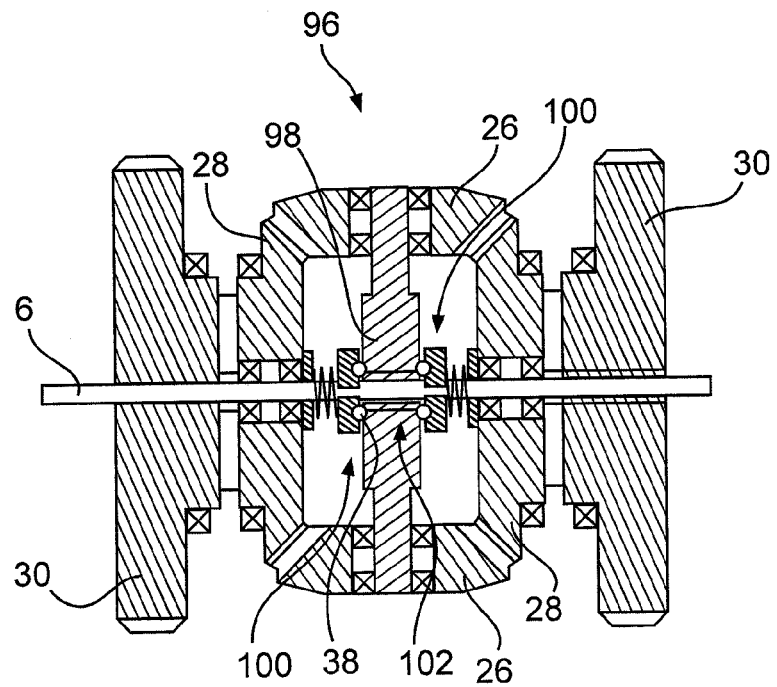
FIG. 7 shows a differential with a ball ramp device between a carrier of planetary gears and a main shaft of the drive system in a sectional view.

In case a differential is jammed or somehow blocked due to a failure, a rigid connection between the main shaft and a carrier would result in providing a braking function and therefore blocking all other differentials as well. As this degrades the function of a high lift system or another system comprising control surfaces that are driven by a similar drive system, this may be a disadvantage. As shown in FIG. 7, a rigid connection between the main shaft 6 and a carrier 98 that rotatably holds planetary gears 26 may be designed such that the connection is eliminated if a predetermined maximum torque is exceeded. Herefore another ball ramp device 100 is arranged between the carrier 98 and the main shaft 6, the carrier 98 comprising indentations 102, the main shaft 6 comprising indentations 104 between which balls 38 are held. Again, this ball ramp device 100 may be designed such that the indentations 102 and 104 hold the balls 38 until an exceeding torque moves the balls out of their indentations 102 and 104 such that a free rotation between the carrier 98 and the main shaft 6 may be accomplished. Such a differential 96 is therefore jamming tolerant and further differentials driven by the main shaft 6 do not need to be arrested.

Figure 8:
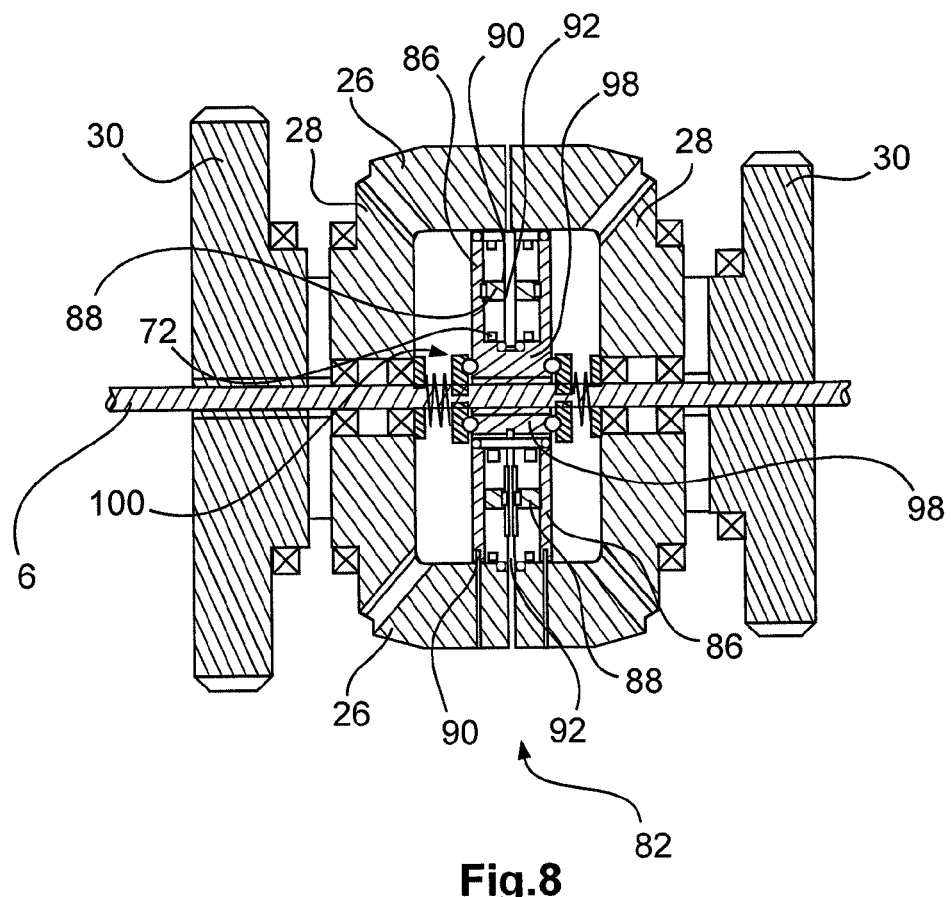
FIG. 8 shows a differential with automatic differential locks connected to planetary gears and a ball ramp device between a carrier of planetary gears and a main shaft of the drive system in a sectional view.

In analogy to the previous figures, the differentials 96 and 82 may be combined. According to FIG. 8, a differential 106 may comprise a differential locking function as presented in FIG. 5 as well as a ball ramp 100 shown in FIG. 7. This may be advantageous as a jam case or another failure may lead to an asymmetric torque transfer such that only one load path is followed or one gear wheel rotates loose. In such a case none of the output gear wheels 30 may conduct any movement with the adjustment lever. Consequently, the differential 106 locks itself. In case the failure occurred due to jamming of the control surface, the torque now may exceed the predetermined maximum torque while still the adjustment lever is not moving in any direction. The ball ramp 100 disconnects the main shaft 6 from the carrier 98 resulting in a standstill of the differential 106 that allows a transfer of torque to other differentials connected to the shaft 6.

Figure 9:
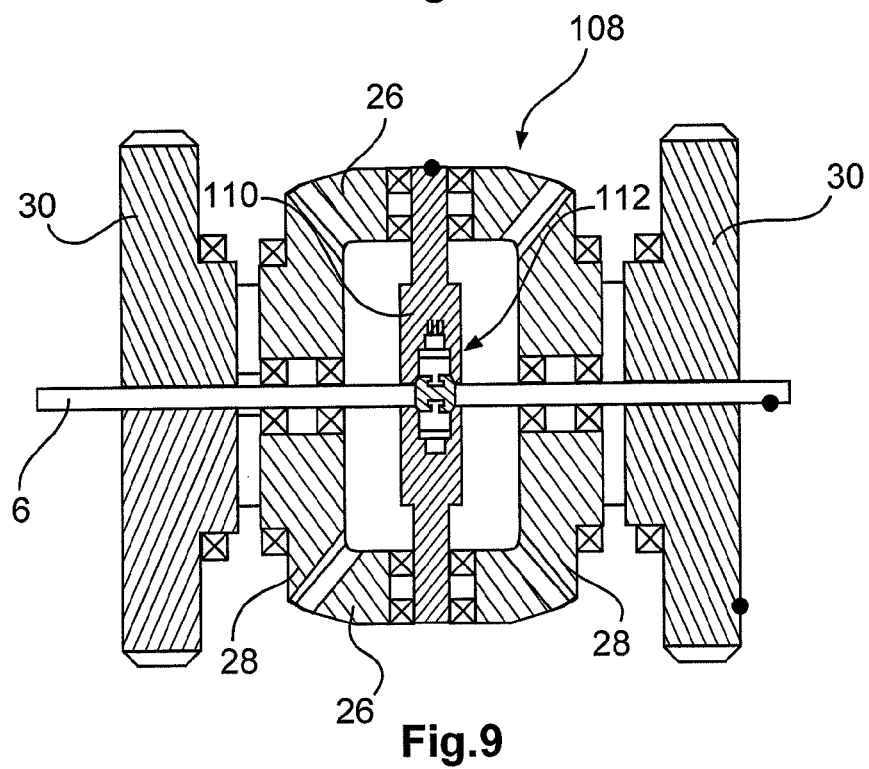
FIG. 9 shows a differential with a shear-pin connection between a carrier of planetary gears and a main shaft of the drive system in a sectional view.

A modification of differential 96 with a ball ramp device 100 shown in FIG. 7 is presented as differential 108 in FIG. 9. There, a carrier 110 is connected to the main shaft 6 over a shear-pin connection 112 that allows to transfer torques up to a predetermined maximum torque depending on the size and material of the shear pins. It is apparent that once the shear-pin connection 112 is broken it must be repaired for the differential 108 to work again.

Figure 10:
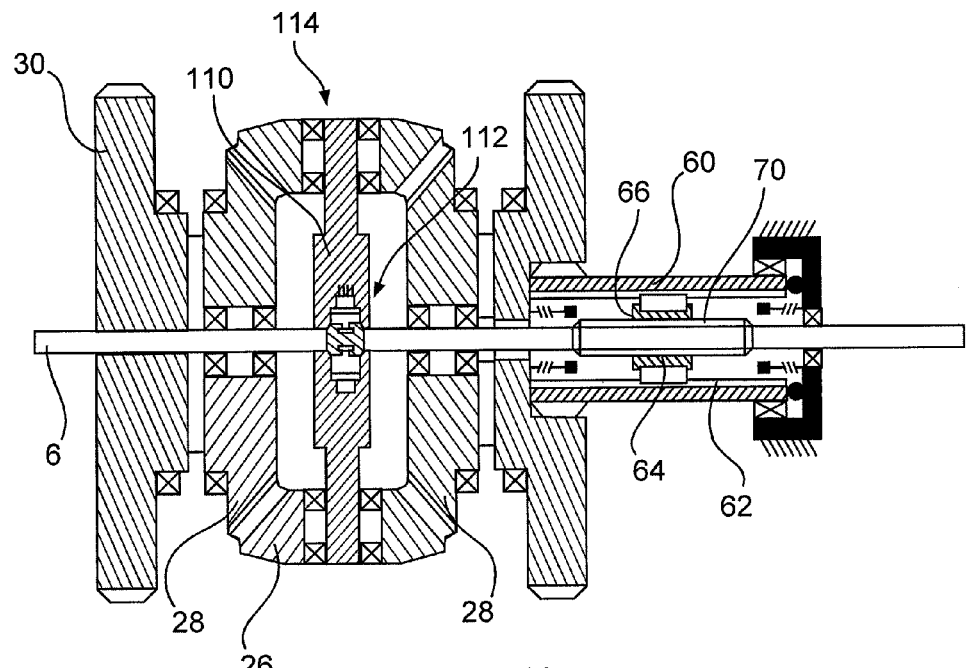
FIG. 10 shows a differential with a shear-pin connection between a carrier of planetary gears and a main shaft of the drive system and an automatic differential lock in a sectional view.

In FIG. 10 a modification of differential 108 is shown as differential 114 and further comprises an automatic differential lock as introduced in FIG. 3 having a bushing 60 with a linear guiding means 62 in which a nut 64 is supported having an inner thread 66 engaging an outer thread 70 of the main shaft 6.

Figure 11:
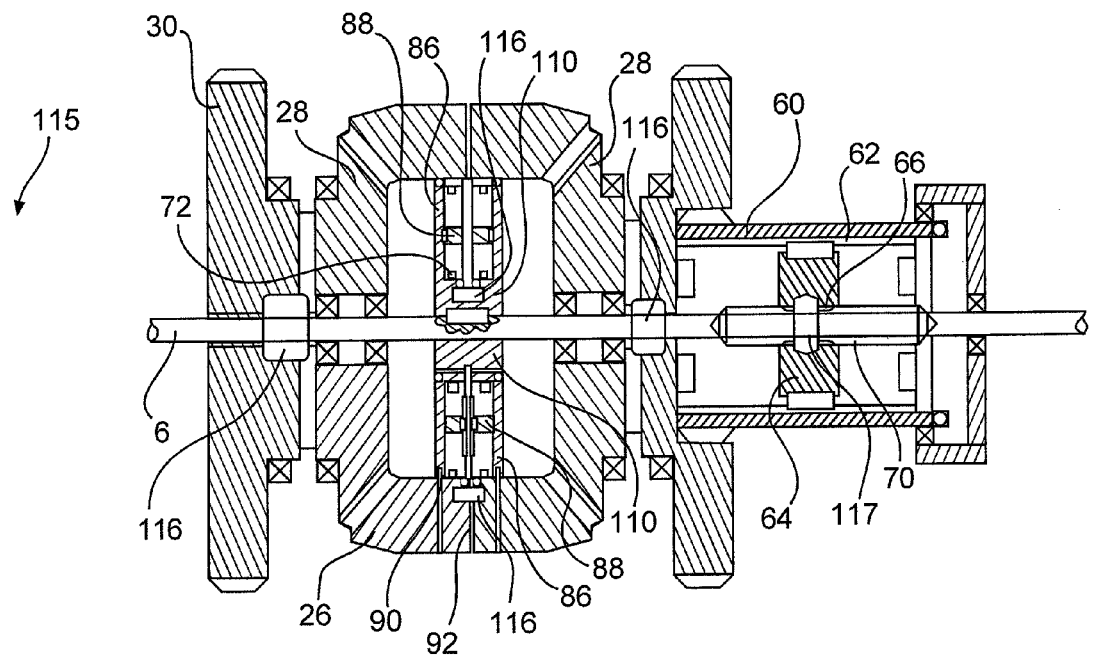
FIG. 11 shows a differential with rotation sensors in a sectional view.

FIG. 11 further shows a combination of differentials 82 of FIG. 5 and 76 of FIG. 4.

Figure 12:
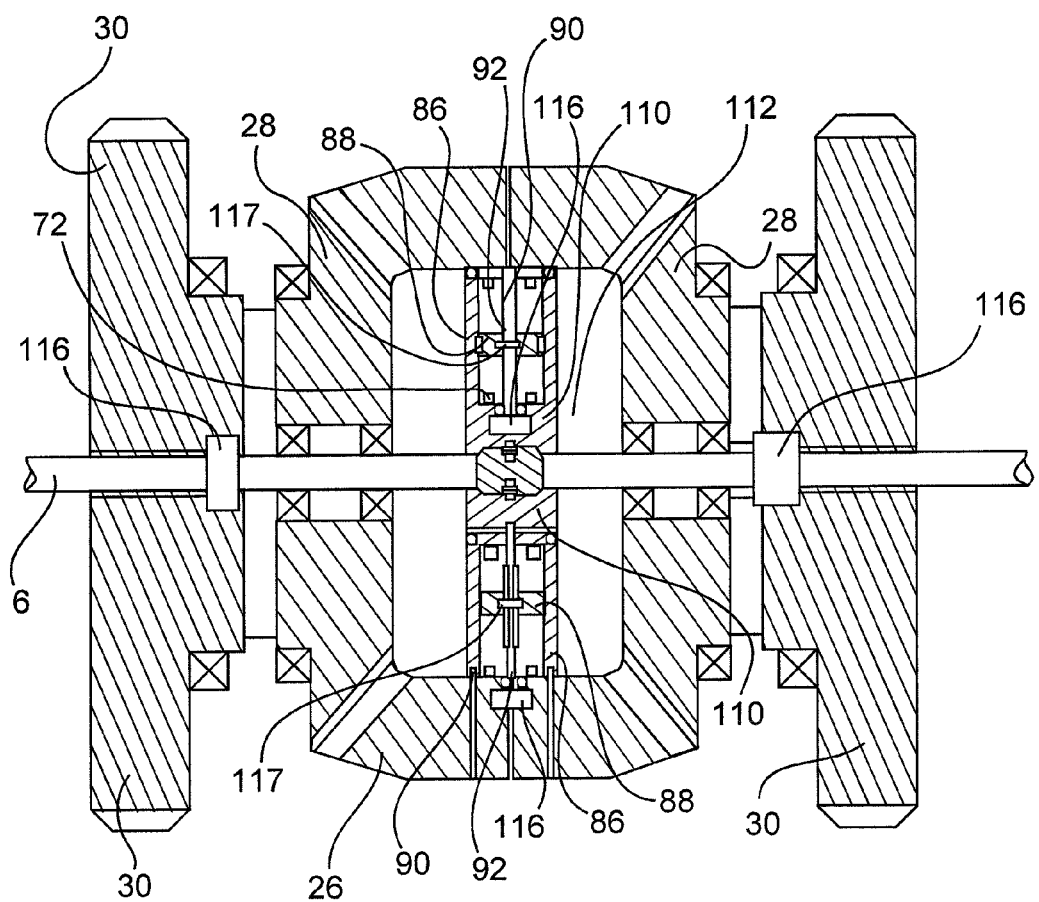
FIG. 12 shows a differential with a shear-pin connection between a carrier of planetary gears and a main shaft of the drive system and with automatic differential locks connected to planetary gear wheels in a sectional view.

In FIG. 12 it is demonstrated to further modify any of the previously shown differentials with rotation sensors 116 to provide a means for detecting the canting of a flap. Thereby it is assumed that each of the two output gear wheels 30 are connected to a flap by means of a lever or the such. Rotational angle sensors 116 and preferably rotary variable differential transformer (RVDT) sense the difference of the rotational speeds between main shaft 6 and left output gear wheel and/or the difference between main shaft 6 and right output gear wheel 30 and carrier and planetary gear 26. If a rotation between the planetary gear wheels 26 and the bushing 86 occurs, the nuts 88 conduct a linear motion, which can be detected by linear motion sensors 117. Thereby, a canting of a flap can be detected, too.

Figure 13:
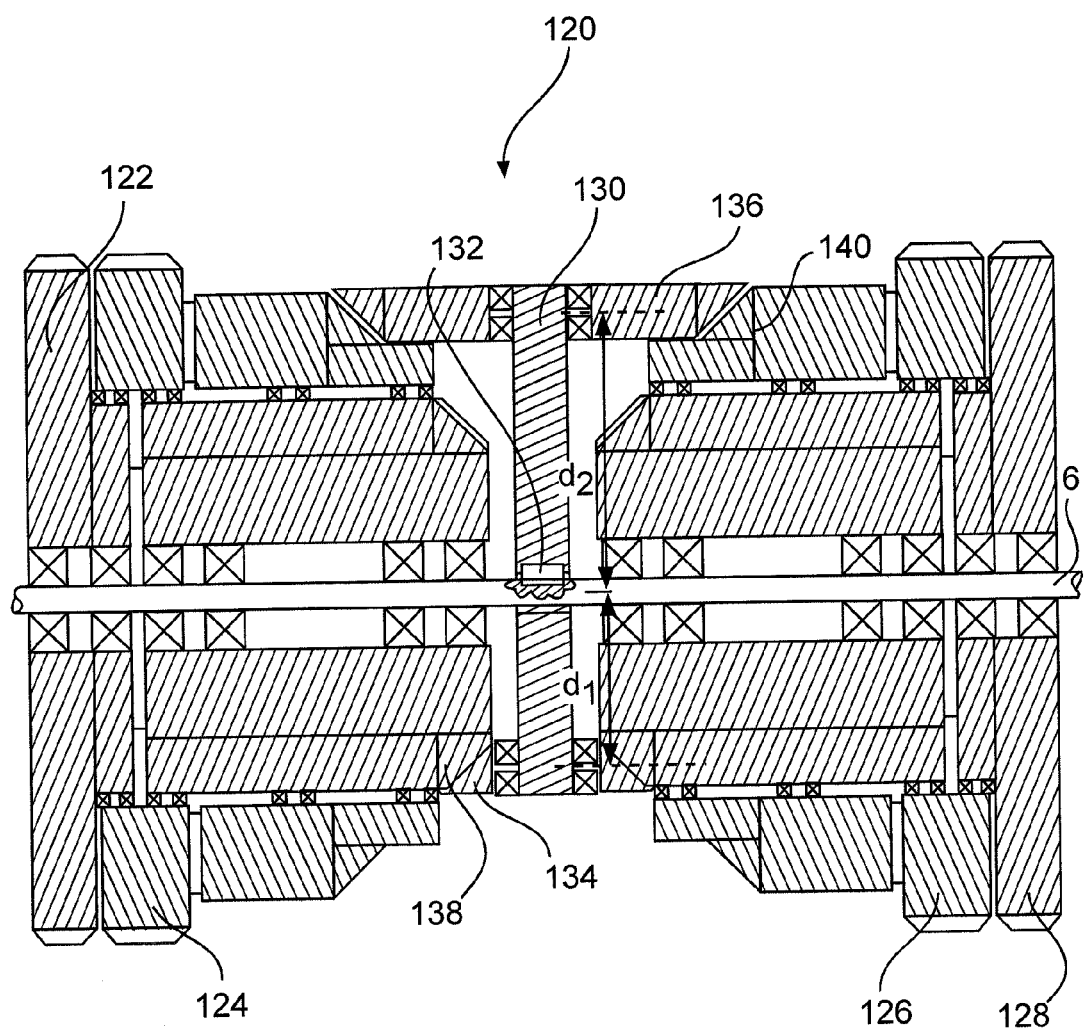
FIG. 13 shows a differential with four output means and a higher degree of redundancy in a sectional view.

FIG. 13 shows a differential 120 that allows to integrate four output means 122, 124, 126 and 128 driven by the main shaft 6 such that altogether four rotary actuators may be driven by the differential 120. First, a carrier 130 is connected to the main shaft 6 by means of a shaft-hub-connection 132. A first planetary gear wheel 134 with a first diameter is rotatably held at a first distance d1 to the main shaft 6. A second planetary gear wheel 136 with a second diameter is held at a second distance d2 to the main shaft 6. The second distance d2 clearly exceeds the first distance d1. Also, the second diameter clearly exceeds the first diameter. By means of the first planetary gear wheel 134 two first sun gear wheels 138 are driven, while the second planetary gear wheel 136 drives two second sun gear wheels 140. The outer output means 122 and 128 are connected to the first sun gear wheel 138, while the inner output means 124 and 126 are connected to the second sun gear wheel 140. Thereby, in a compact differential 120 a high level of redundancy is achieved.

Figure 14A:
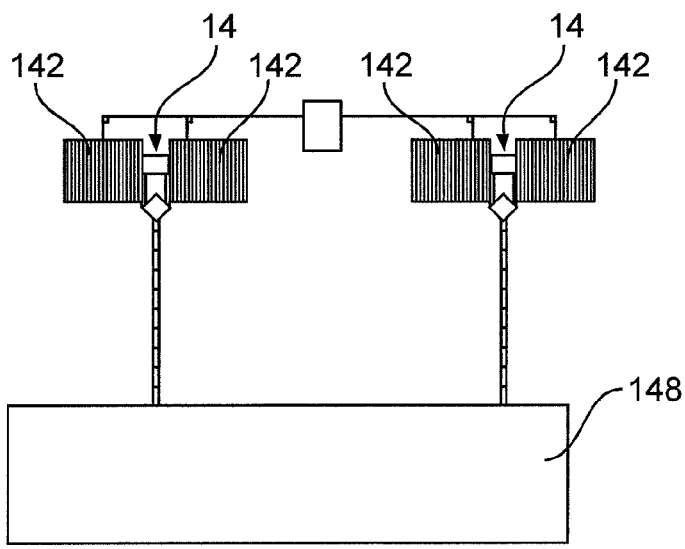
FIGS. 14a, 14b and 14c show different possible options for connecting a drive unit, a differential and rotary actuators for driving control surfaces of an aircraft.
Figure 14B:
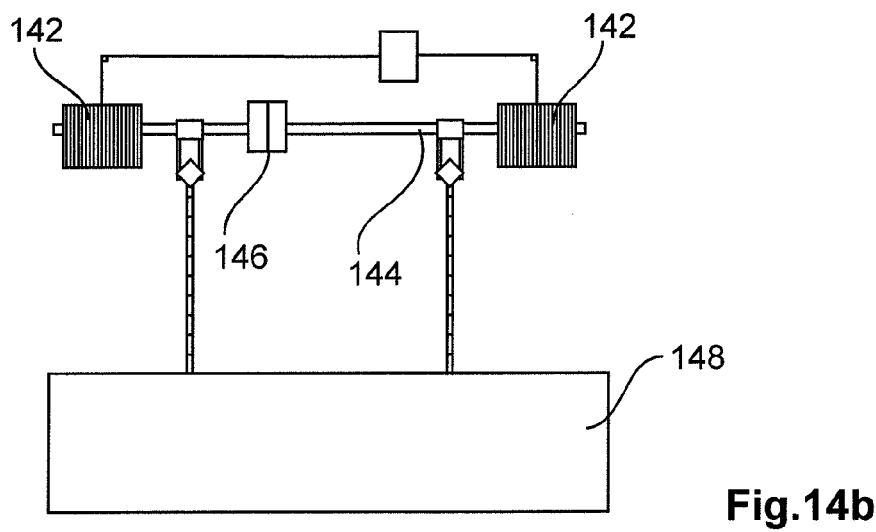
Figure 14C:
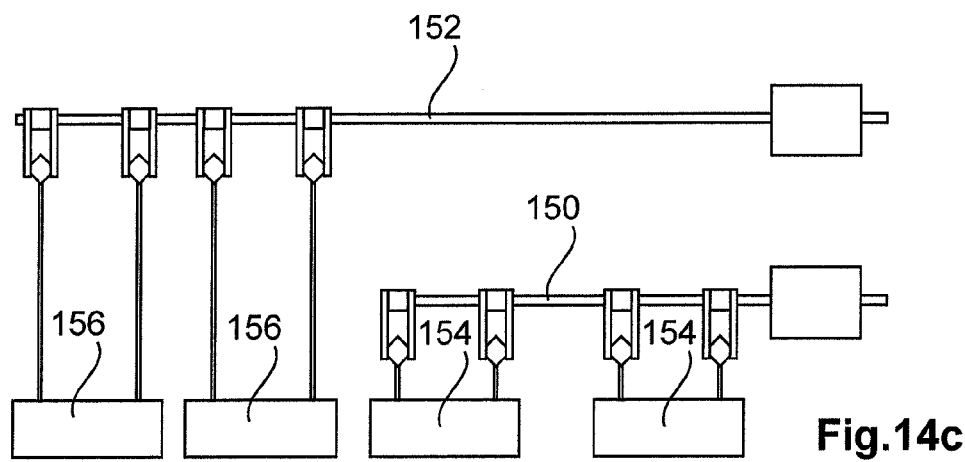

FIGS. 14*a* to 14*c* show further different setups of the drive system. FIG. 14*a* shows the use of two drive units 142 in form of a single motor each for driving a differential 14. Thereby, the main shaft is limited to a motor output shaft.

FIG. 14*b* shows the use of a single main shaft section 144 for a single control surface 148 connected to two drive units 142 at both ends of the shaft section 144. Between the two differentials 14 a brake 146 may be present.

Lastly, FIG. 14*c* proposes to use two separate main shafts 150 and 152 for inboard flaps 154 and outboard flaps 156.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A drive system for driving control surfaces of an aircraft, comprising:
    at least one drive unit;
    at least one main shaft connectable to the at least one drive unit,
    at least one adjusting unit for each control surface to be driven,
    wherein each adjusting unit comprises:
        a differential;
        first and second rotary actuators; and
        an adjustment lever,
    the differential having at least one input means and first and second output means and being adapted to transfer torque from the at least one input means to the first and second output means,
    the input means being couplable to the main shaft,
    the first and second rotary actuators each having a rotation input means and a motion output means, the respective rotation input means of each of the first and second rotary actuators being coupled to one of the first and second output means, and
    the adjustment lever being coupled to the motion output means of the first and second rotary actuators, and
    in an operational stage, the differential being configured to transfer or distribute torque and rotating motion to the first and second rotary actuators.

2. The drive system of claim 1, wherein the input means is a carrier for holding at least one planetary gear wheel of the differential, wherein the at least one planetary gear wheel mutually engages at least one sun gear wheel.

3. The drive system of claim 1, wherein at least one of the first and second output means of the differential comprises a torque limiter coupled to a brake unit wherein the torque limiter is adapted for adopting a first or a second operating states, wherein in the first operating state the torque limiter transfers a torque from a rotation input to a rotation output and wherein in the second operating state the torque limiter decouples the rotation input and the rotation output and acts on the brake unit for arresting the main shaft.

4. The drive system of claim 1, further comprising a torque limiter arranged in a coupling region of the input means and the main shaft, wherein the torque limiter is adapted for adopting a first or a second operating states, wherein in the first operating state the torque limiter transfers a torque from the main shaft to the input means and wherein in the second operating state the torque limiter decouples the main shaft and the input means.

5. The drive system of claim 1, further comprising a differential lock for locking the differential once the output means rotate with different rotational speeds.

6. The drive system of claim 5, wherein the differential lock comprises a first locking body and a second locking body,
wherein either the first locking body or the main shaft has a linear guiding means, wherein the first locking body is connected to a first component of the differential and has first and second end stops located on opposite ends of the first locking body,
wherein the second locking body is slidably supported in the linear guiding means and has a locking thread, the locking thread engaging a thread of either the first locking body or the main shaft where the linear guiding means is not present.

7. The drive system of claim 6, wherein the first locking body is a bushing,
wherein the linear guiding means is arranged on one of the main shaft and an inner surface of the first locking body, and
wherein the locking thread being arranged on one of an outer surface of the second locking body and of an inner surface of the second locking body.

8. The drive system of claim 6, wherein the first locking body is a bushing having a thread-like groove structure on an inner surface,
wherein a threadless and linear guiding means comprising shaft carries at least one body of rotation as second locking body movably engaging with the thread-like groove structure of the first locking body.

9. The drive system of claim 6, wherein the first locking body is coupled to one of the first and second output means.

10. The drive system of claim 6,
wherein the input means is a carrier for holding at least one planetary gear wheel of the differential, wherein the at least one planetary gear wheel mutually engages at least one sun gear wheel; and
wherein the first locking body is coupled to one of the input means and a planetary gear wheel such that the differential lock is activated once the planetary gear wheel rotates relative to the input means.

11. The drive system of claim 6, wherein the end stops comprise at least one sensor that senses the second locking body pressing onto the respective end stop of the first locking body.

12. The drive system of claim 1, further comprising at least one rotational sensor arranged between two components of the differential for detecting a relative rotation of the two components.

13. The drive system according to claim 12, wherein the drive system comprises first and second adjusting units, wherein an evaluation unit recognizes a skew of the control surface by comparing the rotation of components of the differentials of the first and second adjusting units.

14. The drive system according to claim 1, further comprising at least one source of polarized light directing polarized light onto at least one component of at least one differential, and at least one imaging device connected to an evaluation unit and directed to the at least one component, wherein the evaluation unit is adapted for detecting changes of mechanical stress of the respective component.

15. An aircraft having at least one wing, a plurality of control surfaces movably arranged on the wing and a drive system, for driving the plurality of control surfaces of the aircraft, the drive system comprising:
at least one drive unit;
at least one main shaft connectable to the at least one drive unit,
at least one adjusting unit for each control surface to be driven,
wherein each adjusting unit comprises:
a differential;
first and second rotary actuators; and
an adjustment lever,
the differential having at least one input means and first and second output means and being adapted to transfer torque from the at least one input means to the first and second output means,
the input means being couplable to the main shaft,
the first and second rotary actuators each having a rotation input means and a motion output means, the respective rotation input means of each of the first and second rotary actuators being coupled to one of the first and second output means,
the adjustment lever being coupled to the motion output means of the first and second rotary actuators, and
in an operational stage, the differential being configured to transfer or distribute torque and rotating motion to the first and second rotary actuators.

* * * * *